July 30, 1963 M. A. DAVIS 3,099,777
DIGITAL POSITION CONTROL SERVOSYSTEM
Filed July 8, 1960 2 Sheets-Sheet 1

WITNESSES:
John E. Heasley Jr.
James F. Young

INVENTOR
MARVIN A. DAVIS
BY N.W. Brodahl
ATTORNEY

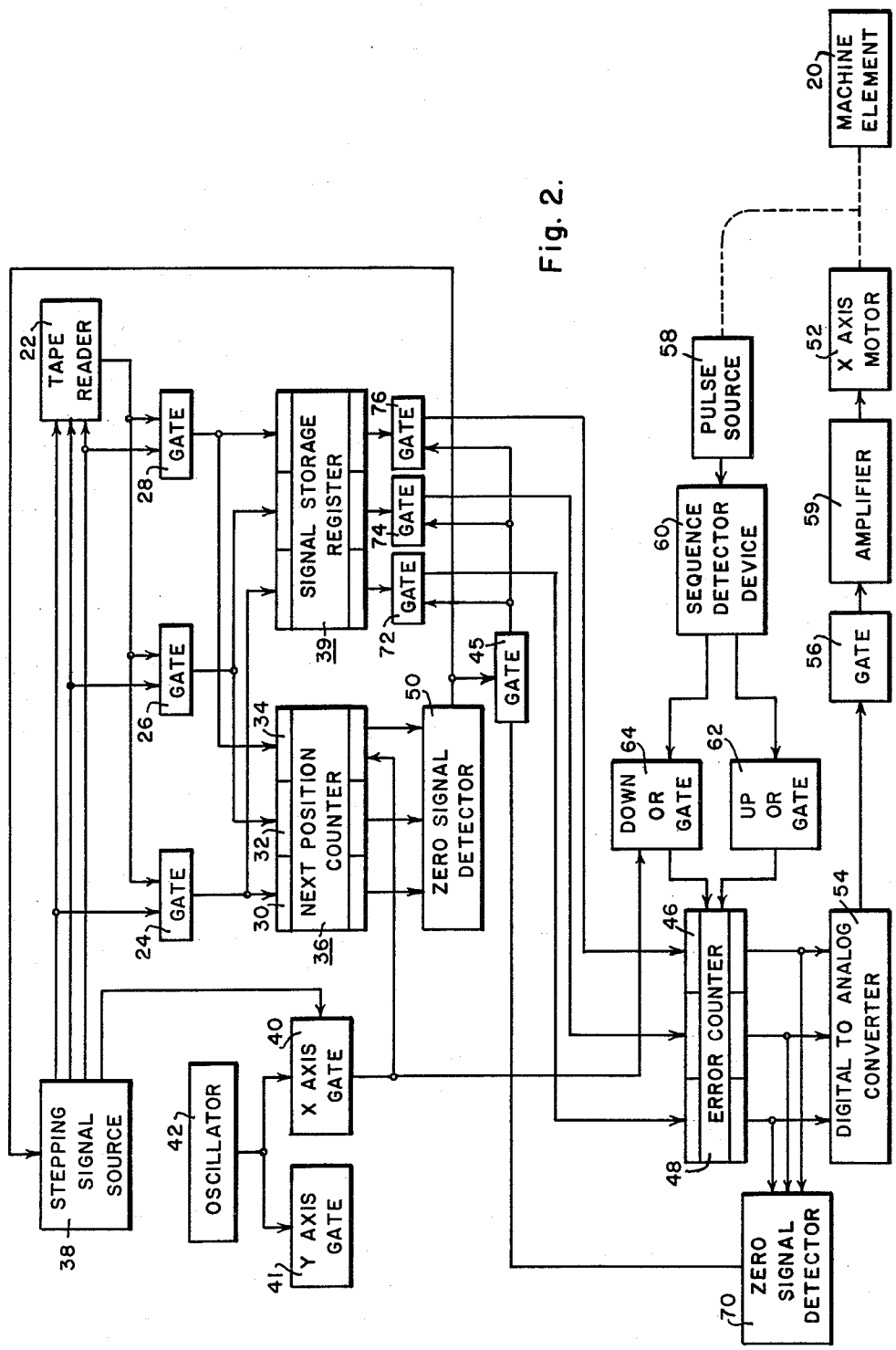

United States Patent Office 3,099,777
Patented July 30, 1963

3,099,777
DIGITAL POSITION CONTROL SERVOSYSTEM
Marvin A. Davis, Clarence, N.Y., assignor to Westinghouse Electric Corporation, East Pittsburgh, Pa., a corporation of Pennsylvania
Filed July 8, 1960, Ser. No. 41,545
8 Claims. (Cl. 318—28)

The present invention relates in general to position control apparatus for a machine member and more particularly to numerical position control apparatus for a machine member.

It is an object of the present invention to provide improved numerical position control apparatus for a machine member such as a machine tool member, which apparatus is more simple and suitable for use with any digital number system.

It is a different object of the present invention to provide improved position controlling apparatus for a machine member, which apparatus requires fewer component parts and is more suitable and faster operating relative to the time required for a given positioning operation.

It is an additional object of the present invention to provide improved numerical position controlling apparatus for a machine tool member, which apparatus is operative in an improved manner with a more advantageous number differencing apparatus arrangement to result in an improved and more reliable positioning of the machine member from an actual position to a desired or reference position.

Further objects of the present invention will become apparent from the following description taken in conjunction with the accompanying drawings, wherein:

FIGURE 2 is a schematic showing of the numerical positioning control apparatus in accordance with the teachings of the present invention.

Figure 1:
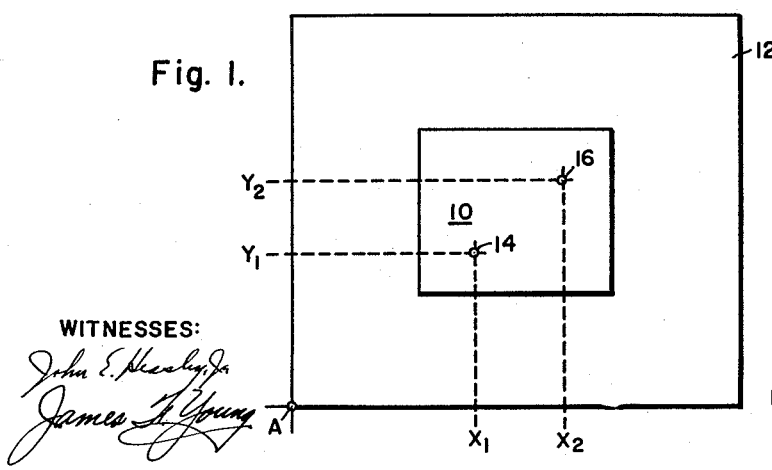
FIGURE 1 is a plan view of illustrative workpiece apparatus showing a first or actual position of a machine member and a second reference or desired position for that machine member.

In FIGURE 1 there is shown a workpiece 10 positioned on a work table 12 or the like of a machine tool member, such as a drill press for the purpose of illustration. It is assumed that a first hole 14 has already been drilled at a position on the workpiece 10 corresponding to the X1 and Y1 coordinates as shown in FIGURE 1 relative to a reference point A. It is now desired that a second hole 16 be drilled at a coordinate position defined by X2 and Y2 as shown in FIGURE 1. For this purpose, it is necessary that a first or Y axis control motor move either one of the table 12 or the drill mechanism along the Y axis from the position Y1 to the position Y2. Further, it is desired that the second or X axis control motor move one of the table 12 or the drill mechanism along the X axis from the position X1 to the position X2. Thusly, the drill will be in the proper position relative to the workpiece 10 to complete the hole 16 at the coordinate location defined by X2 and Y2.

In FIGURE 2 there is provided a schematic showing of the present numerical positioning control apparatus for the drill mechanism, which has been illustrated as the machine element 20. The next desired position X2 is supplied by a suitable tape through a tape reader 22 in the form of a binary signal, such as for example a binary coded decimal signal, which is supplied through the provided gate circuits 24, 26 and 28 to the respective stages 30, 32 and 34 of the next position counter 36, in a sequence and manner determined by the stepping signal source 38 and as will be later explained. The latter stepping signal source 38 may comprise a mechanical stepping switch, although a static and electrically operating type device would more probably be provided in this regard. A signal storage device 39 which may be in the form of a register including a plurality of flip-flops as necessary to store the input signal information is similarly supplied the next desired or X2 position control signal through the gate circuits 24, 26 and 28 as shown in FIGURE 2.

In the operation of the tape reader 22 and the gate circuits 24, 26 and 28 connected between the tape reader 22 and the next position counter 36 as well as the signal storage register 39, the binary coded signal for the X2 position of the X axis motor for example is first supplied decade by decade, for the example of a binary coded decimal signal, to the next position counter 36 and the signal storage register 39. More specifically, if it were desired to position the workpiece or the machine element 20 to an X2 coordinate of 43.8, the stepping signal source 38 would be operative to first connect through the gate 24 the most significant decade signal 4 in the binary coded decimal form of 0100. Next the stepping signal source 38 would cause the digit 3 to be similarly supplied through the gate 26 to the second stage 32 of the next position counter 36 and to the corresponding stage of the signal storage register 39. Finally, the stepping signal source 38 would open the gate 28 such that the digit 8 signal would be supplied in binary coded decimal form to stage 34 of the next position counter 36 and the corresponding least significant stage of the signal storage register 39.

The stepping signal source 38 would then open the X axis gate 40. This would cause the output counting signals from the oscillator 42, having a frequency of 10 kilocycles for example, to be supplied to the least significant stage 34 of the next position counter 36 and also to the least significant stage 46 of an error counter 48. When the signals from the oscillator 42 cause the next position counter 36 to be counted successively through its stages to a zero signal condition, then the zero signal detector 50 would provide an output control signal. The latter control signal is supplied to the stepping signal source 38 for advancing the operation of the present control apparatus to repeat the above operation relative to a succeeding binary coded decimal signal for the next or Y2 position of the Y axis motor, not shown, for example. In this regard the desired position control signal for the Y axis motor could be similarly supplied to the next position counter 36 and counted into an error counter for the Y axis motor in a manner similar to the above described operation for counting the next position control signal into the error counter 48 for the X axis motor 52.

It should be here noted that simultaneous positioning control operation for each of the X axis motor 52 and the Y axis motor 53 could be accomplished by providing a separate next position counter and signal storage register for each of these motors, if so desired.

The control signal from the zero signal detector 50 is operative to open the gate 45 and to close the X axis gate 40 when it advances the position of the stepping signal source 38.

The error counter 48 is continuously connected to a digital to analog converter which converts the total or residual count in the error counter 48 to an analog control or error signal. This analog control signal is supplied through a gate 56, when the latter gate is open, and a conventional amplifier 59 to the X axis motor 52 for causing it to change the position of the machine element 20 whenever an analog control signal is supplied by the digital to analog converter 54.

The X axis motor 52 is mechanically connected to a pulse source device 58 which provides output pulses to a sequence detection device 60 for providing either one of a control signal through an up OR gate 62 when the X axis motor 52 is operating in a first direction or a control signal through a down OR gate 64 when the X axis motor 52 is operating in a second direction to the respective inputs of the error counter 48. In this regard the error counter 48 is a reversible counter such that the total count in the error counter 48 can be either increased by a control signal supplied through the up OR device 62 or decreased by a control signal supplied through the down OR device 64. The operation of the pulse source 58 and the sequence detection device 60 are believed to be conventional and well known to persons skilled in this particular art.

Thusly, it will be seen that through the operation of the pulse source 58 and the sequence detection device 60, the error counter 48 is continuously supplied a feedback or position measurement control signal in accordance with the movement and thereby the position of the machine element 20. The pulse source 58 may be of the form of any one of several well known pulse sources readily available on the open market at the present time and which provides an output signal in accordance with a predetermined increment of travel movement of the machine element 20, for example every 0.1 inch of travel. In other words, when the machine element 20 travels a distance of one-tenth of an inch a single pulse is supplied by the pulse source 58 to the sequence detection device 60 and to a predetermined one of the up OR device 62 and the down OR device 64. In this manner, the pulse source 58 by supplying output pulses to the sequence detector device 60 indicates the direction of movement of the machine element 20 and therefore senses or provides an indication of whether or not the machine element 20 is moving in a direction relative to the reference point A as shown in FIGURE 1 of greater distance or is moving in a direction to lessen the distance relative to the reference point A.

A zero signal detector 70 is operative with the error counter 48 for sensing a zero signal condition in the error counter 48, and when this occurs the zero signal detector 70 provides an output pulse, through the now open gate 45 due to the control signal from the zero signal detector 50 indicating a zero count in the next position counter 36, for opening the gate circuits 72, 74 and 76 to result in a transfer of a previous operation desired position control signal stored in the signal storage register 39 through the respective gate circuits 72, 74 and 76 to the corresponding stages of the error counter 48 to thereby result in a transfer of the prior operation desired position control signal into the error counter 48, which latter desired position signal corresponds to the present actual position of the machine element 20. In this manner the control apparatus shown in FIGURE 2 is ready to receive a succeeding X axis control signal for a new desired position of the machine element 20.

The error counter 48 which is a reversible type counter receives a control signal in accordance with the position of the machine element 20 through the operation of the pulse source 58 and the sequence detection device 60 and further receives a control signal corresponding to the next desired position signal supplied through the next position counter 36 by virtue of the oscillator 42 counting down to zero the signal stored in the respective stages of the next position counter 36 to thereby change the count that was previously gated into the error counter 48 through the gate circuits 72, 74 and 76. Thusly, any difference between the actual position of the machine member 20 as previously gated from the signal storage register 39 and the next desired or reference position for this machine member will result in an error or difference signal from the error counter 48. For example the previously gated signal could be for the X1 position and the next desired position could be the X2 position. The next desired position signal is supplied to the error counter through the operation of the oscillator 42 as a count through the down OR device 64 relative to the present actual position signal which was side loaded through the gate circuits 72, 74 and 76 to the error counter 48 and thereby the error counter 48 will perform the necessary differencing operation. This position error or difference signal from the error counter 48 and corresponding to the X1 signal minus the X2 signal is the signal supplied to the digital to analog converter 54 and results in the analog error signal supplied to the X axis motor 52 for causing the machine element 20 to move the desired incremental distance along the X axis from its initial or previous X1 position to the next desired or reference X2 position. The resulting movement of the machine element toward the next desired or reference X2 position results in the pulse source 58 and the sequence detection device 60 counting out of the error counter 48 the difference or error signal such that when the machine element 20 is actually in the next desired or X2 position, a zero count will remain in the error counter 48.

Figure 3:
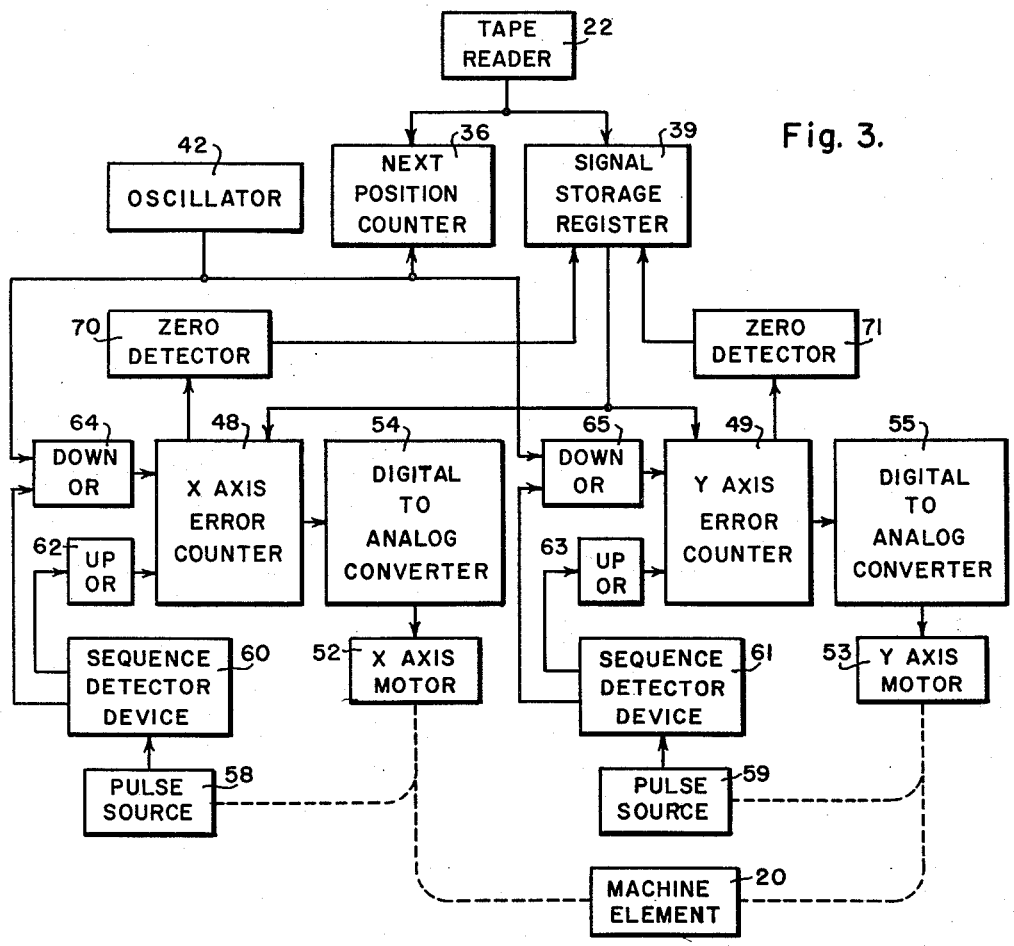
FIGURE 3 is a diagrammatic showing of the position controlling apparatus of FIGURE 2 and including control apparatus for controlling motion along both the X axis and the Y axis relative to the desired position.

In FIGURE 3 there is provided a diagrammatic showing of the control apparatus shown in FIGURE 2 wherein like numbers have been utilized to indicate similar control apparatus component elements. It will be noted relative to FIGURE 3 that the Y axis error counter 49 is operative with the oscillator 42 in a manner similar to the operation of the X axis error counter 48. The gating circuits are not shown in FIGURE 3.

The Y axis error counter 49 is operative as a reversible type counter and receives the machine element 20 position along the Y axis as suitable control signals through the operation of the pulse source 59 and sequence detector device 61 operative through one of the down OR device 65 and the up OR device 63 in a manner similar to the operation of the X axis control apparatus as described relative to FIGURE 2. Also the Y axis error counter 49 receives the next desired or Y2 position control signal for the Y axis movement from the tape reader 22 through the operation of the next position counter 36 for the next Y coordinate position along the Y axis or the Y2 position for the illustration of FIGURE 1. The previously desired position along the Y axis, which is the Y1 or actual position at present along the Y axis is obtained from the signal storage register 39 as was previously described relative to the X axis position controlling operation. The difference or error signal provided by the Y axis error counter 49 is supplied to a digital to analog converter 55 and thereafter to a Y axis motor 53 in a manner similar to the operation of the X axis control apparatus as described relative to FIGURE 2.

In the operation of the control apparatus as shown in FIGURE 2, the oscillator 42 is operative to count down any control signal stored in the next position counter 36 such that the difference between the present position signal and the control signal in the next position counter 36 is thereby provided in the error counter 48. Further in the operation of the control apparatus as shown in FIGURE 2, it should be understood that the X1 or present actual position of the machine element 20 is transferred from the signal storage register and stored as an actual position control signal in the error counter 48. This latter control signal is relative to a zero reference point such as the point A shown in FIGURE 1. Upon suitable command signal the tape is read to provide the next desired or X2 position control signal for the X axis, and then through the operation of the oscillator 42 the X coordinate desired or X2 position control signal is read into the next position counter 36 one digit stage at a time.

The operation of the oscillator 42 through the X axis gate 40 to count down the next position control signal stored in the next position counter 36 and thereby simultaneously count into the error counter 48 this same next position control signal relative to the actual or present position signal already stored in the error counter 48 is thereby operative to provide the desired error signal or difference signal output from the error counter 48 to the analog converter 54.

When the gate 56 is opened for example by a signal from the zero signal detector 50 or otherwise as may be desired, the X axis motor 52 responds to the analog control signal supplied by the digital to analog converter 54 and corresponding to the digital position difference or error control signal supplied by the error counter 48. The machine element 20 is caused to move from its actual position such as X1 in a direction toward the desired or reference position X2 for the machine element 20. As the X axis motor 52 is energized and operates to move the position of the machine element 20, the pulse source 58 provides output signals in the form of respectively a plurality of phase displaced pulses which are understood and decoded by the sequence detector device 60 to provide corresponding control signals to one of the down OR gate 64 or up OR gate 62 for changing the count stored in the error counter 48 in the proper manner to decrease the error signal in response to the movement of the machine element 20 in a direction to decrease the error position. This operation continues until the machine element 20 is moved to the desired or reference position X2 at which time the error counter 48 contains a zero error signal.

The zero signal detector 70 senses this zero error signal condition and provides a control signal through the now open gate 45 to open the gates 72, 74 and 76 to in this manner, transfer into the error counter 48 from the signal storage register 39 the latter next desired position control signal corresponding to the now actual position of the machine element 20.

The signal from the zero error detector 70 could also have opened the gate 56 if desired to prevent the X axis motor 52 from operating in response to the transferred now actual position signal stored in the error counter 48. Then the operation is repeated for the Y axis next desired or Y2 position control signal, with the Y axis gate 41 being opened in a manner similar to the opening of the X axis gate 40 such that the counting signals from the oscillator 42 are operative to establish the Y axis position error signal in the Y axis error counter 49 as shown in FIGURE 3 and in a manner similar to that previously described relative to the X axis control apparatus.

If desired the position difference or error control signal of the error counter 48 may be made to be operative through the gate 56 shown in FIGURE 2 to cause the X axis motor 52 to be operative during the same time period that the Y axis desired position control signal is being stored in the next position counter 36 and being transferred to the Y axis error counter 49. Further as an alternative operation it may be desired to operate both the X axis motor and the Y axis motor simultaneously in which case the gate 56 for the X axis motor 52 may be opened simultaneously relative to the opening of the corresponding gate for the Y axis motor 53 as shown in FIGURE 3.

When the control pulses from the pulse source 58 have counted out the total error or difference signal of the error counter 48, this will stop the movement of the X axis motor 52 in that there is now no longer an error signal and thusly there is no longer an analog control signal supplied by the digital to analog converter 54 to the X axis motor 52. The same is true relative to the control pulses from the pulse source 59 counting out the difference or error signal of the Y axis error counter 49. The polarity of the control pulses from the respective pulse sources 58 and 59 as the control pulses are supplied to the respective error counters is such that the actual position of the machine element 20 along each of the respective X axis and Y axis is caused to coincide with the desired or reference position for the machine element 20 along these respective axes, when each of the error counters 48 for the X axis and 49 for the Y axis register a zero error signal such that the machine element 20 is actually in the desired position for each of the Y axis coordinate Y2 and the X axis coordinate X2 for the example of FIGURE 1.

If it should be desired to control the movement of the machine member 20 in both directions along the X axis as well as along the Y axis with control apparatus other than the sequence detector devices 60 for the X axis and 61 for the Y axis, mechanical polarity switches sensing the movement direction of the machine element along each of the respective X and Y axes could be made effective with suitable well-known logic circuitry to control the application in a similar manner of the output control pulses supplied to the respective error counters. As a zero error condition is approached, the digital to analog converters 54 and 55 respectively can be made to recognize the decreasing error signals and transmit suitable control signals to the amplifiers and respective X and Y axes motors for controlling the slow down of the respective motors as may be desired and as already well-known in this particular art.

The present application is related to a copending patent application entitled "Digital Control Apparatus," filed May 16, 1960, Serial No. 29,192, and a copending patent application entitled "Digital Control Apparatus," filed May 20, 1960, Serial No. 30,617, and assigned to the same assignee.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

I claim as my invention:

1. In position control apparatus for a machine member operative with a desired position signal source, the combination of first signal storage device having a plurality of stages and being operative with said signal source for receiving said desired position signal, a second signal storage device having a like plurality of stages and being cooperative with said first signal storage device and with said signal source for receiving said desired position signal, position feedback signal supply means operative with said machine member for providing a position feedback signal in accordance with the position of said machine member, a third signal storage device operative with one of said first signal storage device and said second signal storage device and operative with said position feedback signal supply means for providing a position difference signal in accordance with a predetermined difference between said desired position signal and the position feedback signal, and a counting signal source operative with said first signal storage device and said third signal storage device for supplying counting signals to said first and third signal storage devices for effecting said position difference signal.

2. In position control apparatus for a machine member operative with a desired position signal source, the combination of a first signal counter device operative with said signal source for receiving said desired position signal, a signal storage device operative with said signal source for retaining said desired position signal, position indication signal supply means operative with said machine member for providing a position indication signal in accordance with the position of said machine member, a second signal counter device operative with said first signal counter device and said position indication signal supply means for providing a position difference signal in accordance with a predetermined difference between said desired position signal and position indication signal and a counting signal source operative with said first signal counter device and said second signal counter device for supplying counting signals to said first and second signal counter devices for providing said position difference signal.

3. In position control apparatus for a machine member operative with a desired position signal source, the combination of a signal storage device operative with said signal source for receiving said desired position signal, position feedback signal supply means operative with said machine member for providing a position feedback signal in accordance with the position of said machine member, a signal counter device operative with said signal storage device and said position feedback signal supply means for providing a position difference signal in accordance with a predetermined difference between said desired position signal and said position feedback signal, and a counting signal source operative with said signal storage device and said signal counter device for supplying counting signal to said signal storage device and said signal counter device for providing said position difference signal.

4. In position control apparatus for a machine member operative with a desired position signal source, the combination of a first signal counter device having a plurality of stages and being operative with said signal source for receiving said desired position signal, position measurement signal supply means operative with said machine member for providing a position measurement signal in accordance with the position of said machine member, a second signal counter device having a like plurality of stages and being operative with said first signal storage device and said position measurement signal supply means for providing a position difference signal in accordance with a predetermined difference between said desired position signal and the position measurement signal, and a counting signal source operative with each of said first signal counter device and said second signal counter device for supplying counting signals to said first and second signal counter devices for providing said position difference signal.

5. In position control apparatus for a machine member operative with a desired position signal source, the combination of a first signal storage device operative with said signal source for receiving said desired position signal, a second signal storage device operative with said signal source for retaining said desired position signal, position measurement signal supply means operative with said machine member for providing a position measurement signal as a function of the position of said machine member, a third signal storage device operative with one of said first and second signal storage devices and operative with said position measurement signal supply means for providing a position difference signal in accordance with a predetermined difference between said desired position signal and said position measurement signal, and a counting signal source operative with said one of said first and second signal storage devices and operative with said third signal storage device for supplying counting signals to said one signal storage device and third signal storage device for providing said position difference signal.

6. In position control apparatus for a machine member operative with a desired position signal source, the combination of a first signal storage device operative with said signal source for receiving said desired position signal, position measurement signal supply means operative with said machine member for providing a position measurement signal in accordance with the position of said machine member, a second signal storage device operative with one of said signal source and said signal supply means for retaining one of said desired position signal and said position measurement signal, a third signal storage device operative with said first signal storage device and operative with one of said position measurement signal supply means and said second signal storage device for providing a position difference signal in accordance with a predetermined difference between said desired position signal and said position measurement signal, and a counting signal source operative with said first signal storage device and said third signal storage device for supplying counting signals to said first and third signal storage devices.

7. In position control apparatus for a machine member operative with a desired position signal source, the combination of a first signal storage device operative with said signal source for receiving said desired position signal, a second signal storage device having a like plurality of stages and being operative with said signal source for receiving said desired position signal, position sensing signal supply means operative with said machine member for providing position sensing signal in accordance with the position of said machine member, a third signal storage device having a like plurality of stages and being operative with said first signal storage device and being operative with said position sensing signal supply means for providing a position difference signal in accordance with a predetermined difference between said desired position signal and said position sensing signal, and a counting signal source operative with said one of the first and second signal storage devices and said third signal storage device for supplying counting signals to said one and said third signal storage devices.

8. In position control apparatus for a machine member operative with a desired position signal source, the combination of a first signal storage device operative with said signal source for receiving said desired position signal, a second signal storage device operative with said signal source for receiving said desired position signal, position feedback signal supply means operative with said machine member for providing a position feedback signal in accordance with the position of said machine member, a third signal storage device operative with one of said first and second signal storage devices and said position feedback signal supply means for providing a position difference signal in accordance with a predetermined difference between said desired position signal and said position feedback signal, and a counting signal source operative with said one signal storage device and said third signal storage device for supplying counting signals to said one and third signal storage devices for providing said position difference signal.

References Cited in the file of this patent

UNITED STATES PATENTS

| | | |
|---|---|---|
| 2,537,427 | Seid et al. | Jan. 9, 1951 |
| 2,886,753 | Abbot | May 12, 1959 |
| 2,922,940 | Mergler | Jan. 26, 1960 |